United States Patent Office 3,461,264
Patented Aug. 12, 1969

3,461,264
METHOD AND APPARATUS FOR WELDING
GIRTH JOINTS IN PIPE LINES
Jerome W. Nelson and Eugene F. Sims, Houston, Tex., assignors to CRC-Crose International, Inc., a corporation of Oklahoma
Filed Jan. 12, 1967, Ser. No. 608,872
Int. Cl. B23k 9/02
U.S. Cl. 219—60
15 Claims

ABSTRACT OF THE DISCLOSURE

A method and apparatus is designed for forming internal pass girth welds in pipe lines by inserting a combination holding clamp-welding system inside the pipe at the joint and forming a weld around the interior surface to secure the pipes together. Preferably a gas shielded consumable electrode welding process is employed, but other processes such as non-consumable (tungsten) electrode or electron beam arc welding techniques may be used. The job may subsequently be completed by additional welding passes on the outside.

Prior art

It has been proposed previously to form girth welds in pipe lines by automatic mechanism but most of these proposals have not proven satisfactory because of equipment size, weight or power requirements, or because the method was too slow or the weld of poor quality. While some attempts have been made to form a weld internally, none of these have proved to be practical for pipe lines and similar massive structures, as far as the inventors are aware.

A particular problem in connection with electric arc welding of pipe ends together is to hold them in proper alignment while making a root pass weld which penetrates deeply enough into the pipe wall to preclude leaks and other flaws in the joint. The present invention is especially designed to accomplish this.

Summary

An internal expanding clamp is provided which holds and shapes the opposed sections of the pipe not only in proper alignment but in proper abutting relationship. If the pipes tend to be elliptical or out of round, the clamp is designed to apply sufficient force to bring the pipe walls essentially into a true circle and also to make the abutting ends concentric; thus complete alignment is achieved all around the joint. The clamp may include means also for pulling the pipe sections together to assure tight abutment between them while the weld is being formed. The welding head or heads travel in planetary fashion around the inside of the pipe wall, welding as they go. Multiple sectors of the joint can be welded simultaneously. The necessary utilities for welding, such as electric power, gas shielding where used and, if necessary, water cooling are supplied through lines which pass into the clamp and are flexibly and detachably connected to the welding head or heads. Plural welding heads may be employed to expedite the welding operation. Upon completion of the internal weld, usually a single pass, the apparatus is moved up to the next joint, any necessary external supplementary welding being finished later as necessary.

Since welding has long since been a bottleneck in pipe line construction, this invention makes it possible to very greatly expedite pipelining procedures in the field. While applicable particularly to larger pipe lines, such as 24 to 42 inch diameter and even larger, the system is applicable also to smaller lines. With suitable modifications it can be used in pipe lines as small as 8 to 12 inches in diameter. However, the major problems of girth joint welding are usually encountered in the larger sizes and the present invention is particularly adapted to solving them.

Preferred embodiments

The system presently preferred is illustrated in the attached drawings wherein.

Figure 1:
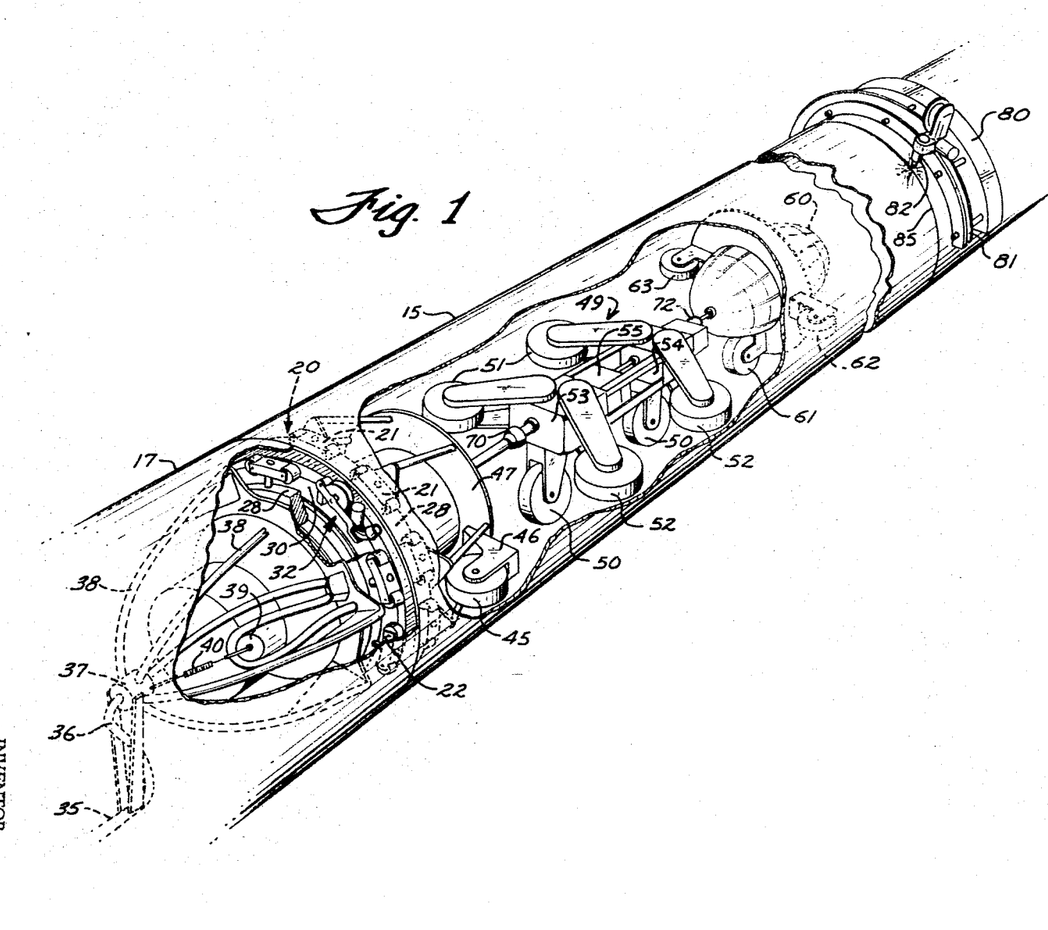
FIGURE 1 is a diagrammatic perspective view of a system of the present invention applied to a pipe line.

Referring now to FIGURE 1, a partly installed pipe line 15 is shown to which additional sections 17 are to be attached. Inside the pipe line is a clamp of more or less conventional type indicated at 20. The clamp has a set of rear clamping shoes 21 actuated by means of known type, such as toggle mechanism. Two rows or sets of the clamping shoes are shown. The front row of shoes, indicated at 22, is adapted to grip the adjacent end of new pipe section 17 which is to be welded next. The two sets of shoes 21, 22 are separately operable, as is well known in the art. The two sets are supported on and activated by support units 27, 28, which may be mounted for limited relative axial motion towards and from each other.

The clamping system, in addition to clamping mechanism per se, includes a face plate or ring 30 which carries a plurality of welding units, one of which is shown at 32. It is adapted to rotate bodily, to carry the welding units around the inside of the joint to be welded. Electric current, gas, and any other utilities required, may be supplied to the welding heads through a hollow reach rod 35, the utility cable, or cable and hose assembly, being shown at 36. The cable-hose assembly extends through a centrally located guide member 37 supported by arched ribs or skeleton frame work 38 at the front of the clamping frame so that the cable and hose lines can be led to the various welding heads 32. As shown, means also are provided in a form of a pulley 39 and a takeup spring 40 for keeping the cable tight, taking up slack and avoiding entanglement with the mechanism as the welding devices move around the periphery of the joint being welded.

Figure 11:
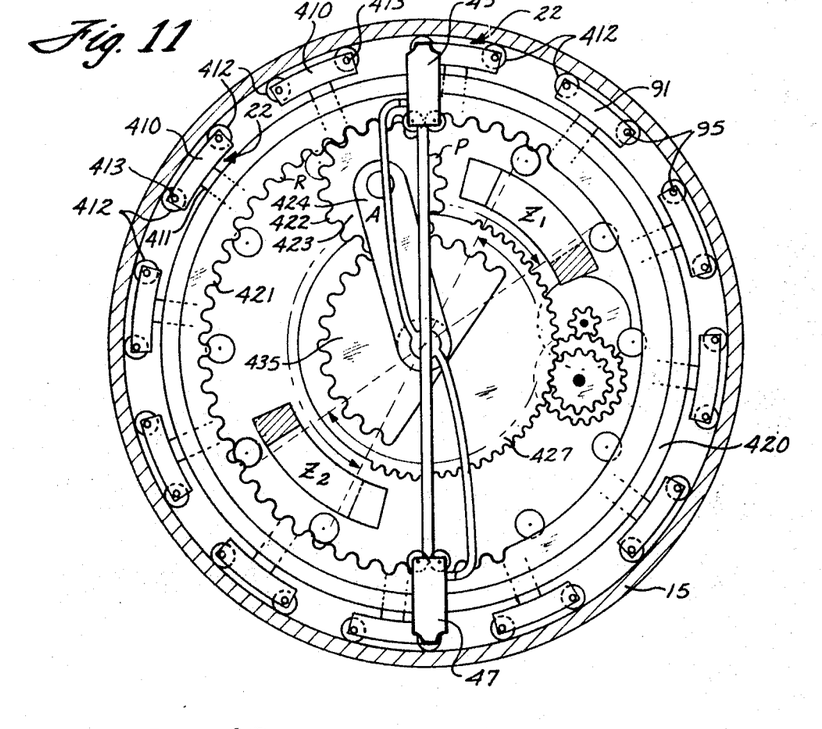
FIGURE 11 shows an alternative design for the clamp and welder combination wherein the welding services, such as electric power, gas, etc., are brought in through the axis of the clamp.

Except for the welding mechanism, which will be described in greater detail, and except for modifications in clamp mechanism which it may necessitate, the operation of the clamp is quite conventional. Toggle apparatus, or cam means, or other suitable devices may be used for expanding the clamping shoes 21 or 22 to grip the pipe sections as near as practicable to their abutting ends, with sufficient force to round out the pipe ends and to hold the two adjoining pipe ends in concentric positions, so that there will be good alignment all around the joint for weld formation. That is, the clamping shoes are sufficiently numerous and close together to insure that the adjacent pipe ends will be held in proper and identical shapes to obtain the required alignment all around the pipe. FIG. 11, for example, shows twelve shoes and twenty-four contact points.

The clamp and welding unit 20 is supported on a plurality of wheels so that it can be rolled along inside the pipe line, as new joints or sections of pipe are attached, one of such wheels being shown at 45, mounted in a suitable bracket or support means 46 attached to a part of the clamp frame 47.

The front clamp shoes 22 and the rear clamp shoes 21 are shown only in part in FIGURE 1. Only a part of the actuating mechanism is indicated in other figures, such as the conventional toggle 115 and the push rods 116, FIGURE 3, such being conventional and well known in the art. The ring or face plate element 30 which carries the welding heads 32 is shown in part and is driven in either direction in circular motion by a weld travel motor 120, shown in FIGURE 3 and diagrammatically in FIGURE 2, through an output shaft 122 which carries a spur gear 123 meshing with teeth on the inside of the ring 30. Two welding heads 32 are visible, one at the top and one at the bottom of FIGURE 3. Four such heads may be used, as will be explained further below. Each of these is supplied with electric current and with shielding gas through a line 36 which is part of the utility cable-hose assembly 35 as previously described. A guide element in the form of a post 140 attached to the ring or face plate 30 keeps the cable from becoming entangled in the moving mechanism and a guidepost 141 in the rigid clamp frame provides an opposing guide and also an anti-friction support for the cable. In this way, the cable can follow the welding head through its circular movement, e.g. of 90 degrees or more, in either rotary direction. It will be understood that the welding heads, even when four are used, may be moved somewhat more than 90 degrees to provide a suitable overlap for the respective weld sectors, as is well known in the art.

Figure 3:
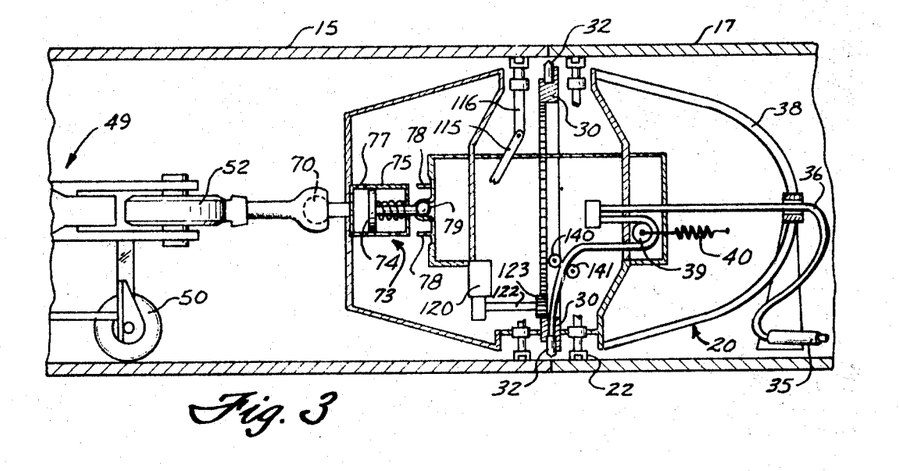
FIGURE 3 is a diagrammatic view, partly in longitudinal section, showing some of the elements of FIGURE 1 and FIGURE 2.

The takeup cable pulley 39 and the spring 40 are shown also in FIGURE 3 and it will be understood that the spring 40 will yield out only sufficiently to maintain enough tension on the utility cable assembly to keep it out of the way, but allowing enough freedom for the assembly to permit the full movement without likelihood of pulling the connections loose.

In the use of the device, it will be understood that the hollow reach rod 35, through which cable assembly 36 passes, is long enough to project to the front end of each new section of pipe as it is attached. Normally, these pipe lengths are 40 feet each but in some cases where double jointing is practiced, they may be 80 feet long and the reach rod is of at least corresponding length.

In the preferred arrangement, a traction device 49 is provided behind the clamp so as to propel it in either direction into or out of the pipe line. This is particularly useful in hilly terrain where the pipe line may go up or down grade. The traction device has sufficient power to propel the assembly up hill and sufficient braking force to hold it against movement on a downhill slope. The traction device comprises a plurality of support and guide wheels 50, 51 and 52, at least some of which are driven to provide the necessary tractive force in the embodiment shown. The driving power may be connected to the four wheels 51 and 52 through suitable gearing 53, 54 but it can be applied to other wheels if desired, or to a smaller number, as will be obvious. An air operated drive motor indicated at 55, but not shown in detail, furnishes the tractive power.

Attached behind the traction device is an air tank indicated at 60 and supported on weight carrying wheels 61 with lateral guide wheels 62 and 63. The three units, that is the clamp 20, the traction device 49 and the tank 60 are connected by ball joint units 70 and 72 so that the mechanism can negotiate curves and turns in bent pipe. A hose connection, not shown in detail, is a part of the cable-hose assembly 36. Through it, the air in tank 60 can be replenished by connection to an outside compressor, as required. Ordinarily it will be pumped full after the unit has been moved up to each new joint. The compressed air is controlled through suitable valving to operate the tractor motor 55, the clamp shoes 21 and 22, and the extension system 75.

As seen in FIGURE 3, the ball joint connections 70 between the propulsion unit or tractor 49 and the clamp-welder unit 20 is provided with a yieldable extension 73 in the form of a piston 74 in a pneumatic cylinder 75, with a strong compression spring 76 behind the piston. The cylinder is normally held tightly against a pair of stops 78 so that a second ball joint 79 cannot bend. However, when compressed air is admitted, under suitable valve control not shown, through intake valve 77, the spring 76 is compressed, cylinder 75 moves away from stops 78, and both joints 70 and 79 can flex to permit full orientation and alignment of the clamp-welder mechanism into the proper position and plane for welding. The manner in which this alignment of the plane of the ring or face plate 30 with respect to the plane of the girth weld is achieved is described more fully below. By pushing the clamp away from the traction device, assuming that the latter is locked or braked in a predetermined position within the pipe line, the clamp may be moved ahead a short distance and on reverse movement it is drawn back towards the tractor. This assists in lining up for the welding operation, as will be seen below.

A means and method for forming complementary external weld passes are shown at the right or upper end of FIG. 1. A ring or band 80, attachable to the pipe line, preferably to the section already installed, carries or incorporates a guide track 81. The latter supports and guides an external welding head 82 which is movable in an orbital path along the guide track, i.e. along the weld line 85, to form an external pass weld. The details of this mechanism form no part of the present invention.

It will be understood that the respective weld passes or segmental weld passes on the exterior will be started at different positions around the pipe wall periphery to make sure that these are properly overlapped. This provides further insurance against combinable flaws forming leak paths in the finished weld.

Refer now to FIGURES 2 and 2A, 2B and 2C. The system will be explained diagrammatically by reference to a single moveable face plate system. In this case the face plate indicated at 100, which may replace or be identical with ring 30 already described, carried four welding heads or units 101, 102, 103 and 104. These welding units are each secured, preferably in a manner to permit ready detachment, to the ring 100 so that as the latter rotates the welding heads must move with it around the circumference of the weld and apply respectively segments or sectors of a first pass internal bead or weld. The drive motor 120 through a small gear 123, as already mentioned, meshes with teeth on the interior of the ring. The motor 120 is reversible so that the ring can be driven in either direction. Assume that the weld starts in clockwise direction with weld heads 101 and 102 at the positions shown.

Figure 2:
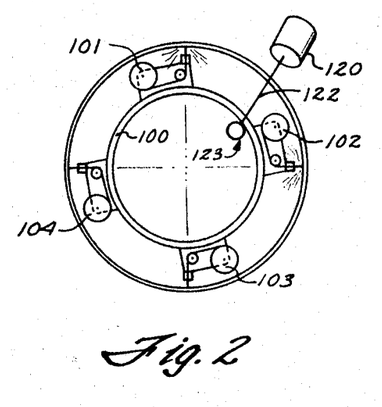
FIGURE 2 is a diagrammatic view in cross section showing a single ring or face plate carrying multiple welding heads for forming the internal weld.
Figure 2A:
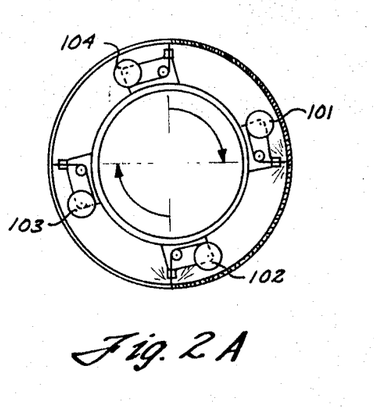
FIGURE 2A is a diagrammatic view similar to FIGURE 2 showing the parts in a second position and FIGURES 2B and 2C are similar views showing other positions.
Figure 2B:
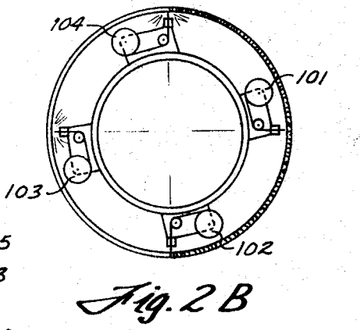
Figure 2C:
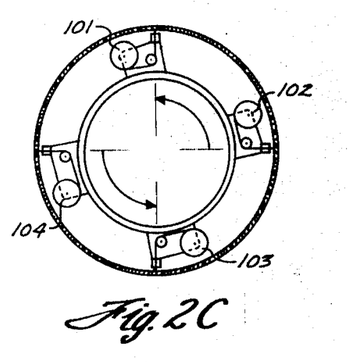

Referring now to FIGURE 2A, weld unit 101 has been moved to the "three o'clock" position and the other units have all been displaced 90 degrees from the positions shown in FIGURE 2. Assuming that weld units 101 and 102 are firing, the joint has now been welded about or slightly more than half way around its circumference by clockwise motion of the ring. This brings the welding head 104 to the top of the circular joint. As shown in FIGURE 2B, welding the other half can now commence in a counter-clockwise direction. The whole ring 100 with all four welding heads, but with only heads 104 and 103 firing, is moved through 90 degrees, or a little more, to provide overlap at top, bottom and 9 o'clock positions, and welding heads 104 and 103 thus weld completely around the other side of the pipe. This brings the welding head 101 back to the top of the joint, as shown in FIGURE 2C, and restores all the heads to their original position. Thus in two 90 degree movements, one in each direction, a complete peripheral weld is made.

Refer again now to FIGURE 3. There is shown in some detail, partly in cross-section, some of the clamping and welding structure which is not visible in FIGURE 1. The clamp 20, shown in position between pipe sections 15 and 17 comprises the cage structure 38 as previously described. Means not shown in detail but including clamp units 27, 28 in FIGURE 1 are employed to force the front and rear sets of clamping shoes 21, 22 closer together, to bring and hold the adjacent pipe ends in proper welding relationship such as tight adjustment.

As is mentioned above, the welding units per se are carried by the ring or face plate 100 and are normally secured thereto during welding operations. However, it is frequently necessary to clear or repair some of these parts, or to replace reels of wire, etc. Therefore, it is desirable to make the welding head units per se readily detachable from the supporting ring mechanism.

Figure 4:
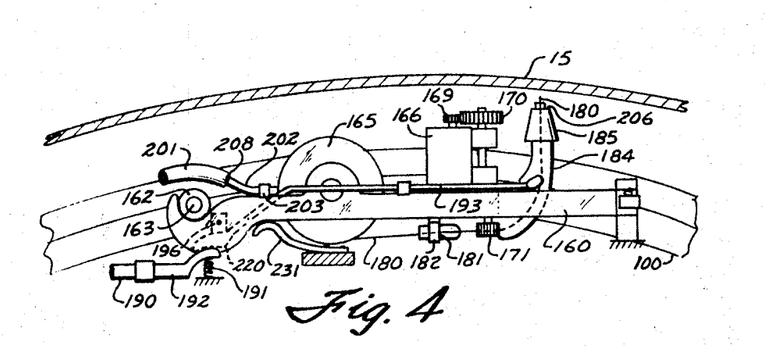
FIGURES 4 and 5 are respectively elevational views and plan views of a welding head subassembly.

As shown in FIGURE 4, each of the units 101, 102, etc., is made up of a somewhat U-shaped frame 160 which has its ends terminating in a connector element 161 fitting around a roller 162 supported by a transfer shaft 163 which is secured to the face plate 100. The U-shaped frame member 160 carries a support for a reel of wire 165, a drive motor 166 for wire feed rollers 167, 168, in FIGURE 5 which it drives through appropriate gearing 169 and 170. One or both of the feed rollers 167 and 168 may be knurled as indicated at 171, FIGURE 4. The wire supplied from the reel 165 is indicated at 180 and in this instance forms the consumable electrode for the welding process. It is directed through a first guide 181 secured to a bracket 182 supported in the frame member 160 and the wire proceeds through a curved guide 184 to the welding head 185. Thus as the motor 166 is driven, wire is fed from the reel 165 through the welding head, to be melted by the arc and deposited on the pipe elements as the welding operation takes place.

Figure 5:
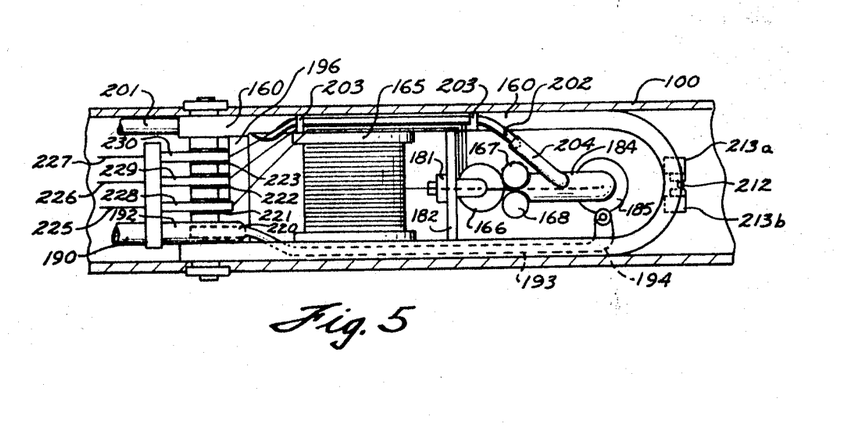

A heavy electric cable for supplying welding current is shown at 190 and it connects under pressure of a spring 191 to make sliding or wiping contact through wiper 192 with an insulated conductor 220 mounted on a transverse shaft 196 in frame 160. From conductor 220 current is conducted through a cable 193 to the arm 194 which carries the current to the welding head 185. FIGURE 5 shows a bottom view of the latter mechanism.

A supply of inert gas to shield the weld, against oxidation, particularly in the case of consumable electrode welding, is brought in through a tube 201 which connects to a metal conduit 202 secured by straps 203 to one side of the frame member 160. The tube 202 connects to a branched connector 204 forming a part of the welding head assembly 185 so that gas can be fed to the welding head. It passes out through outlet opening 206 to prevent access of atmospheric air to the welding arc, in a manner well known in the art. In this way, weld contamination is prevented. The hose 201 which connects to the tube 202 as just described, preferably is quickly releasable at the connection 208. The right end of the U-frame 160, as shown in FIGURES 4 and 5, is normally held in place by a latch 212 between posts 213 which are secured to the ring 100. Ordinarily, the subassembly just described is inserted with the holding element 160 attached to the roller 162. Pressing against element 196 are the spring lifted heavy contactor 220 and smaller electric conducting contactors 221, 222 and 223. The latter connect to conductors which supply current to the motor 166 for feeding wire to the welding arc. The sliders 221, 222 and 223 connect in quick release fashion respectively to electric wires 225, 226 and 227 which are connected to them through wipers 228, 229 and 230, respectively. It will be understood that appropriate electric power and controls are connected to the wires 225, 226 and 227 so that the motor 166 can be driven in a desired direction and at suitable speed for feeding wire from reel 165 through guides 181 and 184 to the arc.

The specific design of this particular removable welder unit is not a part of the present invention being disclosed and claimed separately in an application of Nelson et al., Ser. No. 755,035, filed Aug. 21, 1968.

Referring further to the elements of FIGURES 4 and 5, it will be understood that the complete weld units 101, 102, etc. may be detached at the right ends 212, between elements 213a, 213b and raised up. The hose connection 208 is first removed and the connections 208, etc., are broken so as to lift the assembly out of the welding unit. The ring 100 can be moved back or forth to a convenient position for this purpose, since the motor 120 which drives it, shown in FIGURE 1 and in FIGURES 2 and 3 diagrammatically can be inched forward and backwards under manual control as desired. In the operation of welding, the welding head 185 may frequently get spattered with metal and may show some corrosion. Difficulty may be encountered occasionally with the feed wires or guides of the wire electrode 180 and the wire spool 165 requires frequent replacement. The wire feed rollers 167, 168 and other parts may require cleaning and other parts may need adjustment. Since the individual welding unit 101, etc., is readily detachable, all these operations are facilitated. It is convenient to have some spare sub-assemblies already loaded with wire 165 to snap into place quickly in order not to delay the pipeline operation while a welding head is being repaired or while wire is being replaced.

Figures 6, 7, 8, 9, 9A, 9B:
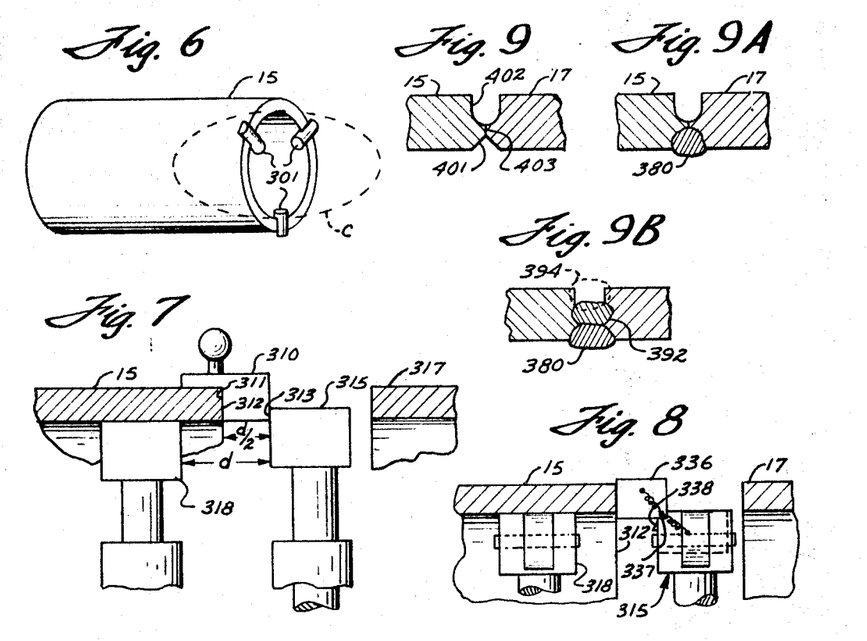
FIGURE 6 is a diagrammatic perspective view showing a method by which the clamp and welding apparatus is aligned with the pipe ends for proper placement of the weld.
FIGURE 7 shows one example of a gauging device which can be used for alignment purposes and FIGURE 8 shows a different modification, wherein an aligning gauge block is attached to part of the clamping mechanism.
FIGURE 9 shows in cross-section a fragment of a preferred joint design with the parts unwelded but in position for welding.
FIGURES 9A and 9B show in cross section consecutive steps in the welding operation.

An important feature of the present invention has to do with the accurate location of the welding mechanism with respect to the weld to be formed. This has been mentioned above. For a good sound weld, the wire 180 should be fed precisely to the juncture between the two pipe sections. This position must be maintained while the welder units 101, etc., rotate around the inside circumference of the joint. Since three points determine a plane, it is possible to effect a gauging or positioning operation prior to formation of each weld. This gauging or locating of the clamp-welder unit should be done quickly so as not to delay the operation unduly. As shown in FIGURE 6, assuming the fixed pipeline 15 has a plane end, the proper plane for positioning of the apparatus is thus determined by three points distributed around the end of the pipe. Three position gauges or stops 301 therefore are employed to place the welding mechanism at the proper location. By setting the pins or locators 301 out to engage the pipe end and then them, then inserting the clamp into the pipe 15, in the manner already described, the shoes inside pipe 15 are correctly positioned and thereafter may be expanded to pipe shaping holding position. Then the unit is in proper position to weld the first pass. That is to say, the final position along the pipe 15 of the clamp shoes inside it is determined precisely by the end face of this pipe, as sensed by the gauge pins or locators 301, so as to insure proper alignment of the welder to the joint. See also FIG. 10A, mentioned further hereinafter, where the welding head 585 is shown in precise longitudinal alignment with the joint, being held there by closely adjacent sets of clamp shoes engaging the inside ends of the pipe sections on either side of the joint to be welded.

These positioning gauges, shown only diagrammatically in FIGURE 6, may take several different designs as will be explained next.

In FIGURE 7 there is shown a manually placed gauge block 310. This is positioned on the installed pipe section 15 having a shoulder 311 which contacts the end 312 of this pipe. The design of the gauge shoulder 311 of course will vary with the sort of end surface, i.e. bevel or other finish, on the end of the pipe but it should be such as to accurately locate the gauging blocks 310 with respect to the pipe. The gauge also has another face or shoulder 313 which fits against the rear edge of the front or facing surface clamping shoe elements 315 which are expandable to grip the next pipe section 317. Assuming that the welding wire is centered between the front and rear shoes and the distance between the front and rear shoes 315 and 318 is $d$, as shown by the arrows, the distance between the shoulders 311 and 313 in a direction parallel to the axis of the pipe is $d/2$. The clamp is moved until the rear faces of front shoes 315 are in abutment against the shoulder 313. Three of the positioning elements 310 are used, one at about each 120 degrees of arc around the circumference of the pipe. These gauges or blocks 310 preferably are magnetic so that they will hold themselves on the pipe. They can be placed manually on the pipe surface and remain there until the clamp shoes are brought back tightly against them. The inner or rear shoes 318 are then expanded to grip the pipe 15. The front shoes 315 are next contracted, and the blocks 310 are removed. The pipe 317 is pushed into place over shoes 315 abutting the pipe 15. Then the shoes 315 are expanded to grip the new section 317 and to hold the two pipe sections together in tight end abutting relationship. With this arrangement welding can proceed.

An alternative alignment system is shown in FIGURE 8 wherein a gauging block 336 is pivotally attached at 337 to the front shoe 315. Three such devices are spaced around the periphery of the clamp. In this case the clamp is brought back to press the gauge surface of block 336 against the face 312 of the installed pipe section 15 and the rear clamp means 318 are expanded to grip section 15. Then the new pipe section 17 is brought in, the front gauging shoes 336 being pivoted to the dotted line position and inside of the clamp where they are out of the way, around pivot 337. A coil spring 338 holds the gauging block out of the way of the pipe as well as of the welding mechanism and as soon as the shoes 315 are expanded to hold the new pipe section 17 in place, the welding operation can proceed as above.

According to the present invention, the design of the weld can be varied somewhat. The particularly preferred design is shown in FIGURES 9, 9A, 9B. In FIGURE 9 the pipe 15 is shown as provided with a bevel surface 401 on its inner face and a shallow J-shaped rebate 402 on the outer surface leaving a radial land 403 perpendicular to the pipe axis. Corresponding parts are found on the new joint 17. These parts are abutted together with the lands 403 in tight abutment. Then, as shown in FIGURE 9A, the first pass or inner weld 380 is formed to hold the pipe section together and to penetrate to a suitable depth in the metal. This depth of penetration may be up to as much as half of the pipe thickness or more in thin wall pipe but generally will be of the order of about ⅛ of an inch in pipe that is ¼ to ½ inch thick.

As shown in FIGURE 9B, subsequent welding passes 392 and 394, and more if needed, may be made from the outside to complete the weld. The number of such passes will depend on the thickness of the pipe wall and on its metallurgy. There may be required from one to three or four welding passes in some cases, in addition to the inner first pass, to complete the joint.

Figure 10:
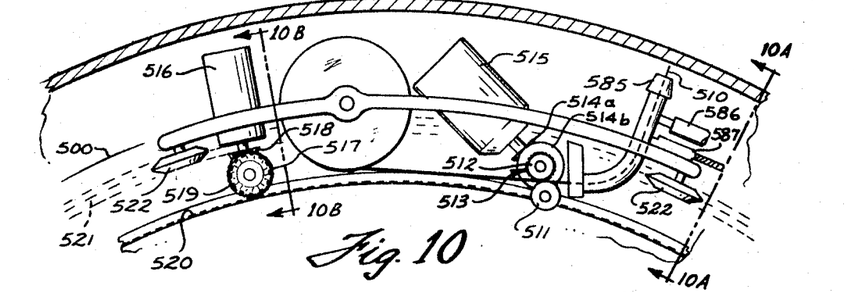
FIGURE 10 is a transverse view through a modified traveling weld unit assembly in a system involving self-propelled and independent welding units.
Figure 10A:
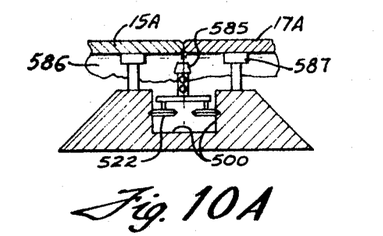
FIGURE 10A is a small scale transverse sectional view taken approximately on line 10A—10A of FIGURE 10.
Figure 10B:
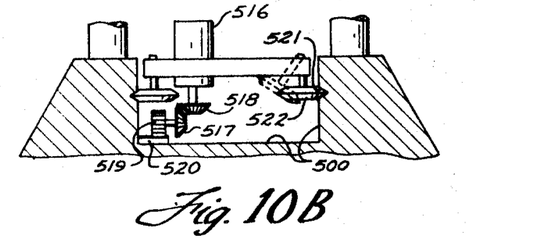
FIGURE 10B is a larger scale sectional view taken at 10B—10B, FIGURE 10.

An arrangement is shown in FIGURE 10 where independent self-propelled welding units, each with its own carriage, are designed to travel on or in a guide track or retainer secured to or built into the clamp body. As shown, each of these units has a welding head 501 to which gas may be supplied via the line 586 and welding current is supplied via the line 587. Wire electrode 510 is supplied by feed rollers 511 and 512, at least one of which has a knurled surface 513 and one of them being driven by the miter and bevel gearings 514a and 514b from a motor 515. An appropriate motor 516, through gears 517, 518, propels a drive wheel 519 which meshes with a rack 520 formed within the ring 500. Both sides of the track 500 have retainer grooves 521 and V-rimmed wheels 522 which serve to retain the carriage in place for proper orbital travel. It will be understood that the track may be formed in other ways, so long as reentrant elements are provided for wheels or rollers to ride in such manner as to hold the welder units in orbit.

Figure 11A:
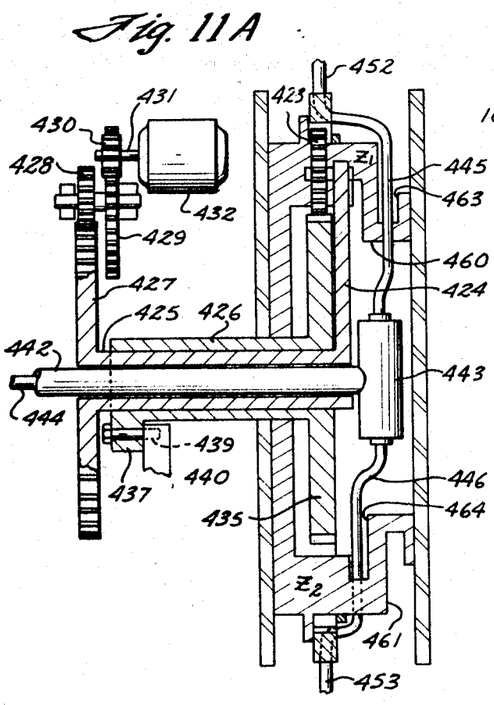
FIGURE 11A is a longitudinal sectional view of the mechanism shown in FIGURE 11.

Referring now to FIGURES 11 and 11A a modified apparatus is shown where the utilities, i.e. electric current and inert shielding gas are brought in through appropriate conduits through the axis of the clamp. This arrangement avoids some of the difficulties that may be encountered when the gas or electric leads are connected from the outside to the swinging or traveling welder units described in the preceding examples.

This embodiment includes some of the elements described above and includes the pipe shoes or gripping members shown herein greater detail. Each of these shoes consists of a plate or bar 410 secured in a way to permit slight rocking to a pusher rod 411 and each containing hard roller 412 with an axle 413, one on either end of each clamp shoe. These rollers are sufficiently hard to bite into the pipe wall slightly and hold it firmly against any endwise slipping. The operating mechanism is such that the shoes are expanded equally, that is, each moves a similar radial distance in a given movement of the clamping mechanism, so that in any clamping position, they all form the true arc of a circle having its center at the longitudinal-axis of the clamp mechanism.

The means by which the welding heads are operated may be varied according to the clamp design but in the arrangement shown in FIGURE 11 a ring, 420, is mounted in a position to move orbitally in a circle around the joint and parallel therewith. This ring 420 is provided with internal gear teeth, 421, which mesh with the teeth, 422, of a swinging or planetary gear 423 operated by a rocker arm 424.

As shown in FIGURE 11A, the arm 424 on which gear 423 is mounted is supported on a rotatable shaft 425 which in turn is mounted inside a larger hollow shaft 426. The latter is mounted for limited rotary movement inside suitable frame members mentioned hereinafter. A gear or gear sector 427 on the other end of hollow shaft 425 is operated by a spur gear 428 which is fixed to the same shaft as a larger gear 429 driven by a gear 430 on the shaft 431 of a reversible electric motor 432. With this arrangement, it will be understood that the arm 424 can be driven in either direction, as desired, to drive the toothed ring 420 clockwise, or counter clockwise. In this way the welding heads may be moved around the inside of the pipe joint to effect the inner weld. A sun gear 435 is fixed to the larger hollow shaft 426 which is normally stationary. Movement of the arm 424 therefore positively drives the ring orbitally around gear 435. The motion of the arm 424 is amplified in movement of the ring so that, for example, an arcuate movement of the arm of 45 degrees moves the welding heads through an arc of 90 degrees or more, depending on the gear ratios. The hollow shaft 426 also has an arm 437 fixed thereto which is adjustably fixed by a bolt 439 to a fixed frame element 440. In this manner, by adjusting the fixed position of the arm 437, the sun gear 435 can be adjusted about its axis to start and stop the travel of the welding heads at the preferred points along the circumference of the weld.

Inside the hollow shaft 425 is a smaller shaft 442, also hollow, which connects to a manifold 443. A cable 444, which may also include a gas supply line, brings electric welding current from the generator to the welding heads 452 and 453, being branched in the manifold to pass through the arms 445 and 446 which lead to the respective welding heads. Shielding inert gas may be led in through the same route. By bringing the lines through the axis, there is no problem of getting the electric cable or the gas lines entangled in the mechanism as it moves around the circumference inside the pipe. Suitable slip rings, not shown, may be used if desired, but since the total twisting of the cable normally will not exceed 190 or 200 degrees of arc, or so (for allowing the heads to swing far enough to overlap the ends of the welds), slip rings ordinarily will not be required with this arrangement.

The clamp structure either must be unitized, i.e., its two halves, front and back, as seen from the end of the pipe line, must be held firmly together in some way to apply the forces required to hold the pipe ends in tightly abutting relationship during the welding operation. For this purpose, as shown in FIGURES 11 and 11A, two heavy Z-frame members are provided, shown at 460 and 461. These are so arranged that the arms 445 and 446 can each swing through a little more than 180 degrees of arc. These arms are made of flexible material, such as braided wire covered hose, to permit necessary flexing. Since the rigid arm 424 swings through a much smaller arc, adequate space for its movement is provided between the Z-bar units. These are so designed that the flexible lines or arms 445, 446 pass through or into different channels 463 and 464, respectively. See FIGURE 11A, especially.

While two welding heads are shown in FIGURES 11 and 11A, it will be understood that a greater number of such may be used, e.g. three or four. This of course complicates the problem of supplying electric current and shielding gas to the multiple heads but it reduces the time for completing the inner pass weld. In large pipe lines, the time required for the initial welding pass is frequently a bottleneck in laying the pipeline, and the added complexity of having three or four welding heads may well be justified.

Figure 12:
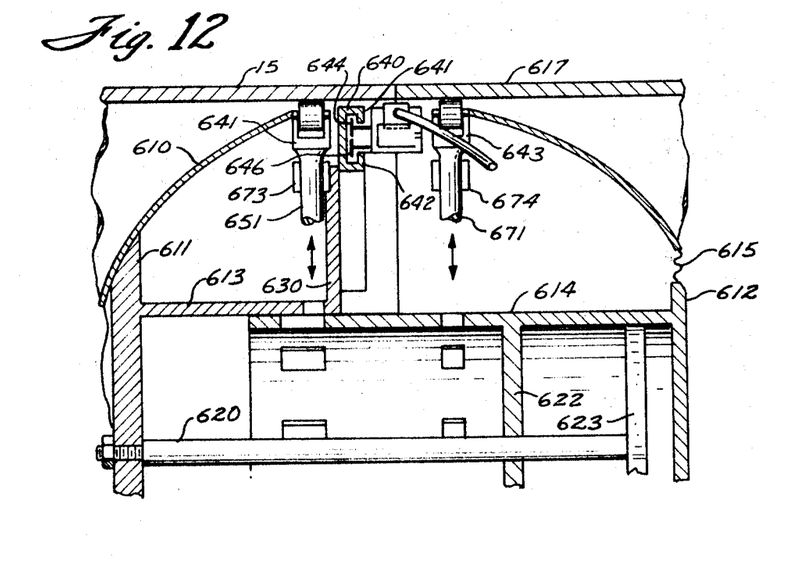
FIGURE 12 is a longitudinal sectional view of still another modification.

FIGURE 12 shows an arrangement by means of which the two sets of clamps, front and rear, may be moved relatively for a more positive and better controlled positioning of the pipe ends in tight abutment.

In this case the clamp and welder combination unit has an outer shell member 610 which is secured to the clamp framework in any suitable manner. As shown, it is fastened, by welding or otherwise, to an end member 611 and flexibly at 615 to an opposite end member 612, respectively, which end members are secured in turn, respectively, to cylinders 613 and 614. The latter cylinder 614 is smaller so as to fit in smooth sliding relationship inside the larger cylinder 613. The arrangement is such that the cylinder 614 supports and operates the clamping mechanism at the right, e.g. for the new length of pipe 617 while the clamping mechanism for pipe 15 at the left is supported and operated by the independent mechanism supported on cylinder 613. A piston rod 620 is fastened to the left frame or end member 611 and passes in sliding but fluid-tight relationship through a cylinder head 622. A piston 623 which can be actuated by fluid, either pneumatic or hydraulic, is fastened to rod 620 to move the members 611 and 612 with respect to each other. The flexible or yielding connection 615 between the outer frame 610 and the member 612 allows for limited movement so that after the inner clamp 641 is expanded to grip the inside end of the fixed pipeline 15, the outer clamp 643 is operated to pull the clamps 641 and 643 towards each other so that the pipe sections are pulled together in firm abutting relationship in order that welding can proceed.

By means of radial arms 630, only one of which is shown in FIGURE 12, the cylinder 613 supports an annular guide track ring 640 on which the traveling welding units are supported and guided during their orbital movement for the welding operation. Ring 640 is formed with overhanging flanges 641' and 642 to provide a guide track which receives and holds for safe travel guide and traction rollers 644 and 646. The traction rollers 646 are driven through suitable gear connections by a motor which is reversible to propel the welding units in either direction around the periphery inside the pipe joint. The arrangement of welding heads may be any of those described above. Clamp operating means 651 and 671, with guides 673 and 674, are conventional.

All of the modifications described above are designed so that the equipment can be drawn quickly out of the welding position and be made ready for connecting the next joint. In a 36-inch pipe, which is typical assuming a weld head travel of about 30 inches per minute and allowing for a short overlap, using two heads simultaneously, each traveling 90 degrees, a half circle weld will be completed in less than a minute. By proper coordination the whole girth weld interior welding pass can be completed in about two minutes. With efficient handling of the clamping mechanism, a whole operation at a joint for making a complete interior pass consumes less than four minutes under reasonable operating conditions.

With the two-head operation, such as in FIGURE 11, the time required for a complete interior pass around the periphery of a 36 inch pipe with both heads firing at once may be about 3½ to 4½ minutes or less. In either type operation, with the four head unit of FIGURE 2 or the two head unit of FIGURE 11, requires that current, gas, etc., be supplied to two heads simultaneously. However, it is often desirable to start the welding operation from the top and move downwardly. In this case, the two units of FIGURE 11 have to be operated in sequence, starting down from the top in one direction with one unit firing and then starting down on the other side with the other unit. The two welds are overlapped and properly joined at top and bottom. Only under favorable conditions can one weld be started at the bottom and moved upward while the other half of the joint is being welded from top to bottom. For this reason, the four head operation of FIGURE 2 usually may be preferred; as a rule there is no difficulty in starting at the side positions, i.e. three o'clock and nine o'clock, respectively.

It will be understood that with respect to all the various modifications described the clamping elements may be operated in any suitable manner, e.g. by toggles, cams, or by fluid piston means. The arrangement of FIGURE 12 has the additional advantage that it can be used to draw the pipe sections into tight abutting contact and hold them there while the welding is done. Various other modifications in apparatus and process will suggest themselves to those skilled in the art. Separate front and rear clamping units, which can be separated and reconnected if desired, may be used to hold and bring together the pipe sections that are to be abutted and welded together. In large pipe lines, means may be included on the welder carriage for a human operator to ride inside the pipe to observe and adjust or control the various elements which makeup the welder. Thus the sequencing may be varied manually, or fine adjustments in placing the welder units in proper position, regulating the wire feed, gas feed, etc., may be made without departing from the spirit and purpose of the invention.

The weld joint design may be varied somewhat and numerous known methods may be employed for completing the outside weld. Various control systems for initiating and stopping operation of moving the welder in position, clamping the pipe ends, and performing the welds may all be automatically programmed, using methods and devices well known in the art.

It is intended by the claims which follow to claim the invention as broadly as the state of the prior art properly permits.

What is claimed is:

1. In a system for automatically welding girth joints located substantially in a transverse plane in pipe lines and the like the combination which includes a clamp structure for firmly holding interiorally and aligning the adjacent ends of two sections of pipe in accurate position for welding, means for aligning said clamp accurately with respect to the plane of the joint to be welded, said clamp structure including expandable means for clamping firmly and shaping to a substantially true aligned configuration each of said adjacent pipe ends and an internal welding head movable around the inner periphery of the joint supported and guided by said clamp structure for effecting a girth weld pass between said adjacent ends.

2. Combination according to claim 1 in which a guide in the form of a circular track element is supported by the clamp in proximity to said joint and wherein the welding head moves along said guide for effecting said girth weld.

3. Combination according to claim 1 wherein the welding head is supported by a movable ring for orbital travel.

4. Combination according to claim 1 wherein the movable welding head is supported by and detachable from a movable supporting ring concentric with the joint being welded.

5. Combination according to claim 4 wherein the welding head is self-propelled.

6. Combination according to claim 4 wherein the welding head is secured to a movable ring mounted between the expandable clamping means for the adjacent pipe ends.

7. Combination according to claim 1 wherein a plurality of welding heads are employed.

8. Combination according to claim 7 wherein the welding heads are movable independently of each other.

9. Combination according to claim 1 wherein conduit means are provided passing through the clamp axis and then between the expandable clamping means for supplying electric current to the welding head.

10. The method of welding a pipeline girth joint located substantially in a plane, which comprises in combination, the steps of (a) inserting into the pipe expandable pressing means and a welder guide and aligning the pressing means by mechanically gauging and spacing said pressing means with respect to said plane of the joint, (b) gripping and shaping the inside and of said first pipe section, (c) placing a second pipe section in welding relationship with respect to said first mentioned section, separately shaping and gripping said second section internally near the joint to hold it securely in welding position, and (d) forming an internal weld pass by passing a welding instrumentality around the inside of said joint.

11. Method according to claim 10 wherein the weld is accomplished in stepped sequence by multiple welder elements.

12. Method according to claim 10 wherein the pipe sections are gripped internally very near their ends and the welding is performed by orbitally moving a plurality of small individual welding instruments each of which forms only a part of said inner weld.

13. Method according to claim 10 wherein a plurality of automatic first pass welding operations are performed simultanously on different parts of the joint circumference.

14. Method according to claim 10 wherein consecutive partial passes are made commencing at different points on the periphery of the pipe, to form overlaps at the ends of said partial passes.

15. Method according to claim 10 wherein the pipe ends are brought to a desired substantially true and aligned configuration by application of pressure to a large number of points closely spaced around the periphery of the pipe.

References Cited

UNITED STATES PATENTS

| 1,846,470 | 2/1932 | Burnish | 219—60 X |
| 3,009,048 | 11/1961 | Stanley | 219—60 |
| 3,207,408 | 9/1965 | Thome et al. | 219—60 X |

JOSEPH V. TRUHE, Primary Examiner

B. A. STEIN, Assistant Examiner

U.S. Cl. X.R.

29—200; 219—160; 228—44

UNITED STATES PATENT OFFICE
CERTIFICATE OF CORRECTION

Patent No. 3,461,264                                Dated August 12, 1969

Inventor(s) Jerome W. Nelson    et al.

It is certified that error appears in the above-identified patent and that said Letters Patent are hereby corrected as shown below:

Column 12, line 5, "and" should read -- end --.

Signed and sealed this 29th day of August 1972.

(SEAL)
Attest:

EDWARD M. FLETCHER, JR.                ROBERT GOTTSCHALK
Attesting Officer                       Commissioner of Patents